US006816498B1

(12) United States Patent
Viswanath

(10) Patent No.: US 6,816,498 B1
(45) Date of Patent: Nov. 9, 2004

(54) METHOD FOR AGING TABLE ENTRIES IN A TABLE SUPPORTING MULTI-KEY SEARCHES

(75) Inventor: Somnath Viswanath, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 772 days.

(21) Appl. No.: 09/686,593

(22) Filed: Oct. 10, 2000

(51) Int. Cl.[7] .............................................. H04L 12/28
(52) U.S. Cl. ..................... 370/412; 370/429; 370/401
(58) Field of Search ................................. 370/389, 392, 370/412, 428, 429, 465, 469, 475

(56) References Cited

U.S. PATENT DOCUMENTS 6,661,787 B1 * 12/2003 O'Connell et al. ......... 370/389

OTHER PUBLICATIONS

Brown, Lawrence. "Linked Lists". Sep. 25, 1999.*

* cited by examiner

Primary Examiner—Chau Nguyen
Assistant Examiner—Derrick W Ferris

(57) ABSTRACT

A method is provided herein for use with a table containing a plurality of data entries, wherein each of the data entries consists of a string of data. Each data entry has a first address addressable by a first pointer from an upstream data entry and a second address addressable by a second pointer from an upstream data entry. Each data entry further includes a third pointer for addressing the address of a downstream data entry and a fourth pointer for addressing the address of a downstream data entry. In the present method, when it is detected, after a chosen interval of time, that a specified data entry has not been addressed by either of its addresses, the first and second pointers to that specified data entry are redirected to the destinations of the third and fourth pointers respectively. That specified data entry may then be deleted without compromise of the function of the table.

10 Claims, 13 Drawing Sheets

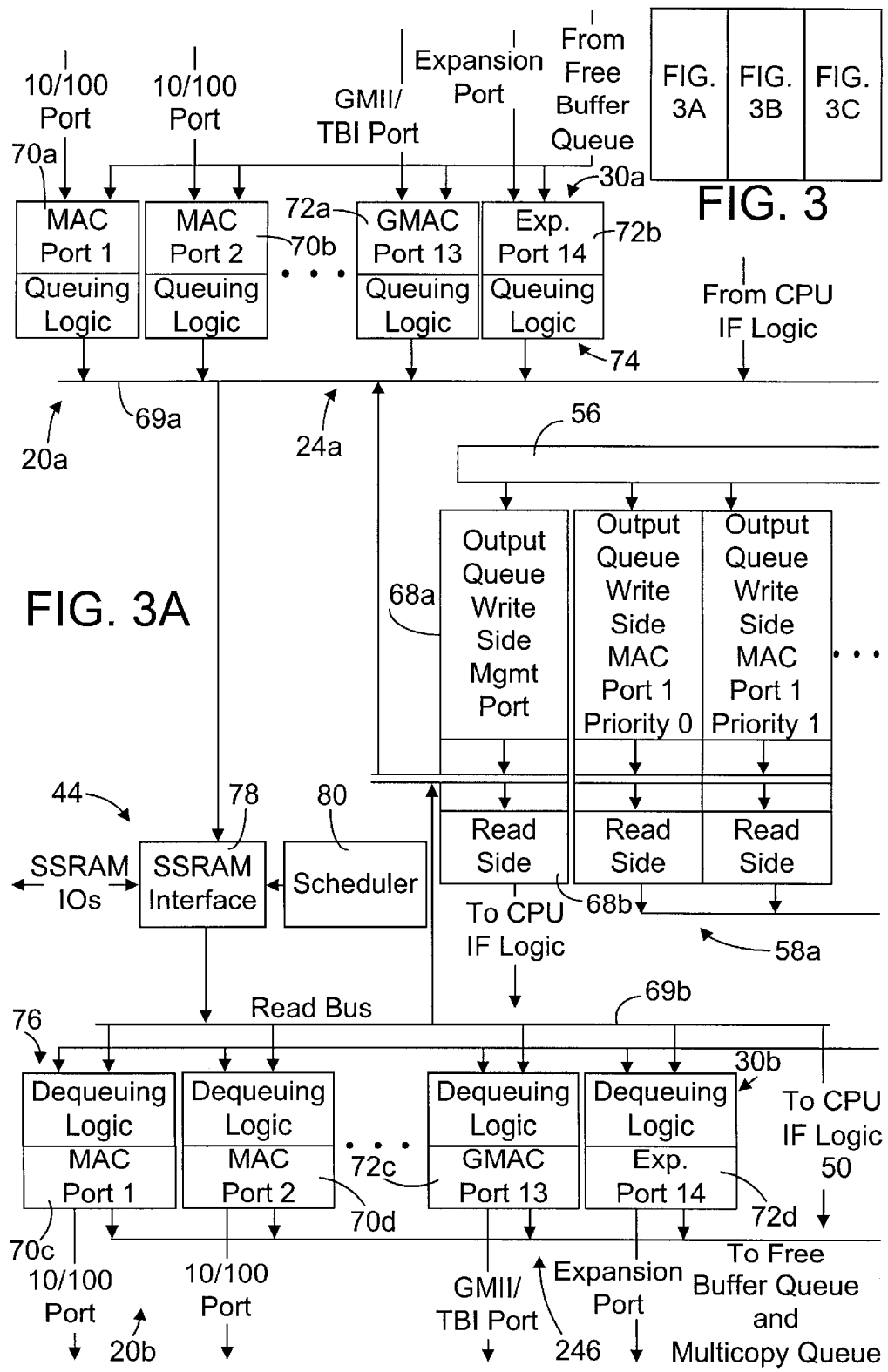

| MAC ADDRESS | IP ADDRESS | VLAN | PV | MAC NEXT POINTER | IP NEXT POINTER | S | H | TC | IP VALID | IP RECLAIM |

FIG. 6

METHOD FOR AGING TABLE ENTRIES IN A TABLE SUPPORTING MULTI-KEY SEARCHES

BACKGROUND OF THE INVENTION

1. Field of the Invention

This invention relates generally to network communications, and more particularly, to a method of aging entries in an address table.

2. Discussion of the Related Art

In computer networks, a plurality of network stations are interconnected via a communications medium. For example, Ethernet is a commonly used local area network scheme in which multiple stations are connected to a single shared serial data path. The stations often communicate with a switch located between the shared data path and the stations connected to the path. Typically, the switch controls the communication of data packets on the network. The networks switch includes switching logic for receiving and forwarding frames to the appropriate destinations. One arrangement for generating a frame forwarding decision uses a direct addressing scheme, where the networks switch includes a fixed address table storing switching logic for the destination addresses.

A layer 3 switching/routing engine consists of a table that can store data entries each made up of a string of data including both a layer 2 address and a layer 3 address, the layer 2 address typically being a 48 bit MAC address and the layer 3 address typically being a 32 bit IP address. In addition to each data entry including a MAC address and an IP address by which such data entry can be addressed from upstream data entries, each data entry further includes a MAC next pointer and an IP next pointer each of which points to downstream data entries.

Typically, when a data entry has not been addressed for a chosen period of time, that entry is "aged" at the end of that period of time by changing an age bit from one value to another, upon which the data entry may be deleted. In the case where each data entry may be addressed by separate addresses, and where pointers may point from upstream data entries to a data entry and from that data entry to downstream data entries, a number of problems arise. For example, it must initially be insured that the data entry is properly "aged", that is, it has not been addressed at either of its addresses for the specified time. In addition, the problem of properly directing the pointers to and from that address to be deleted must be dealt with, or the table can end up having broken, illegal and incorrect links, which will compromise the function of the table.

Therefore, what is needed is a method for aging a data entry in a table, which data entry includes multiple address by which it may be addressed, and multiple pointers thereto and therefrom from upstream and downstream data entries respectively, which takes place in a manner such that proper aging of that data entry is realized, and with the pointers being redirected in a manner which avoids broken, illegal or incorrect links within the table, so that the aged entry can be deleted without compromise of the function of the table.

SUMMARY OF THE INVENTION

The invention is for use with a table containing a plurality of data entries, each of the data entries made up of a string of data. Each string of data contains a first address addressable by a first pointer from an upstream data entry and a second address addressable by a second pointer from an upstream data entry. Each string of data further contains a third pointer for addressing the address of a downstream data entry and a fourth pointer for addressing the address of a downstream data entry. The invention is a method for use with the table, wherein it is detected, after a chosen interval of time, whether a specified data entry has been addressed at either of its addresses, and if it has not been so addressed, the first and second pointers to that specified data entry are redirected to the destinations of the third and fourth pointers respectively. That specified data entry may be deleted without compromise of the function of the table.

The present invention is better understood upon consideration of the detailed description below, in conjunction with the accompanying drawings. As will become readily apparent to those skilled in the art from the following description, there is shown and described an embodiment of this invention simply by way of the illustration of the best mode to carry out the invention. As will be realized, the invention is capable of other embodiments and its several details are capable of modifications and various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as said preferred mode of use, and further objects and advantages thereof, will best be understood by reference to the following detailed description of an illustrative embodiment is when read in conjunction with the accompanying drawings, wherein:

FIG. 6 illustrates the format of a data entry of the address table of FIG. 5.

DETAILED DESCRIPTION

Reference is now made in detail to specific embodiment of the present invention which illustrates the best mode presently contemplated by the inventors for practicing the invention.

Figure 1:
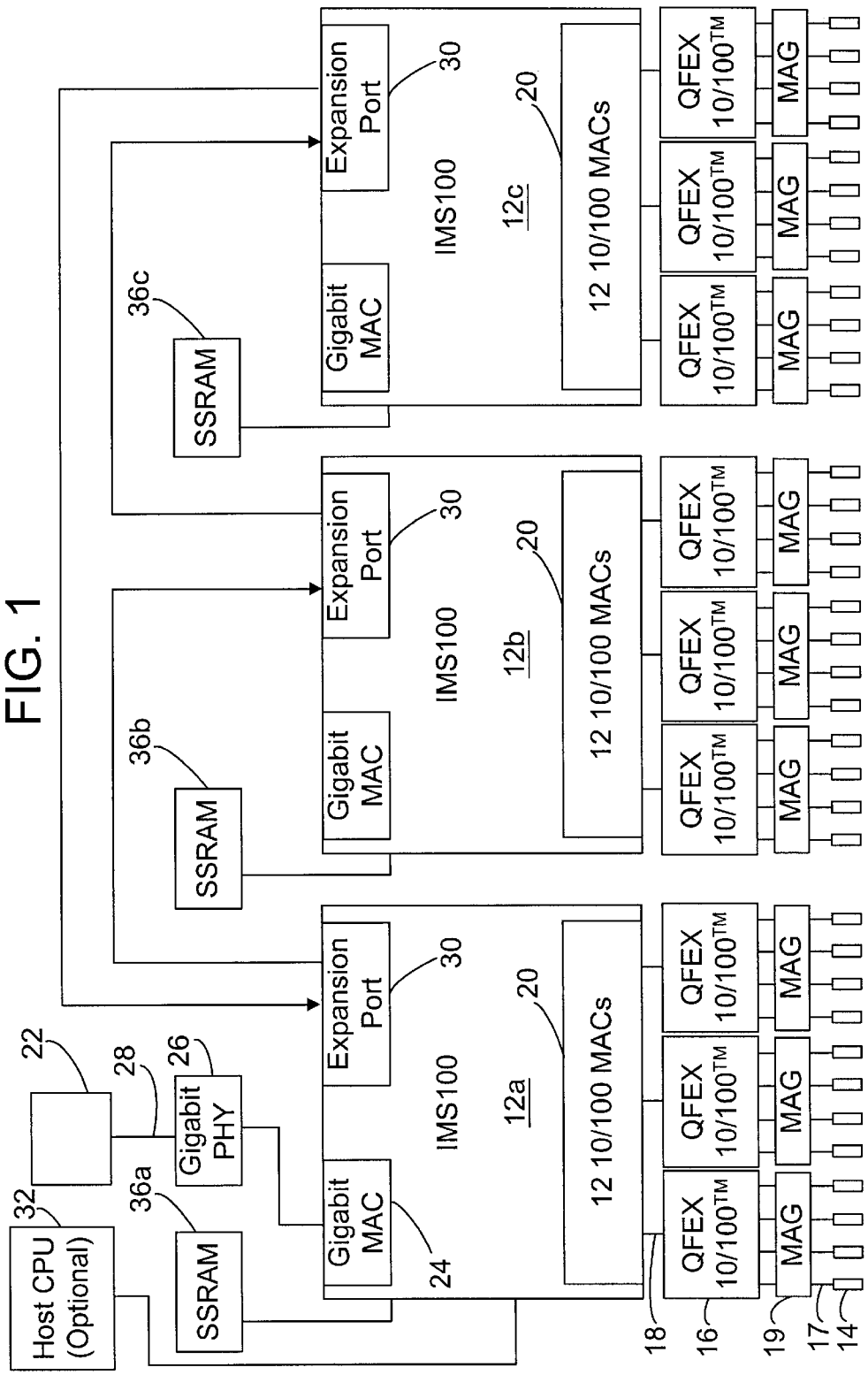
FIG. 1 is a block diagram of the packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (EMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the ring station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
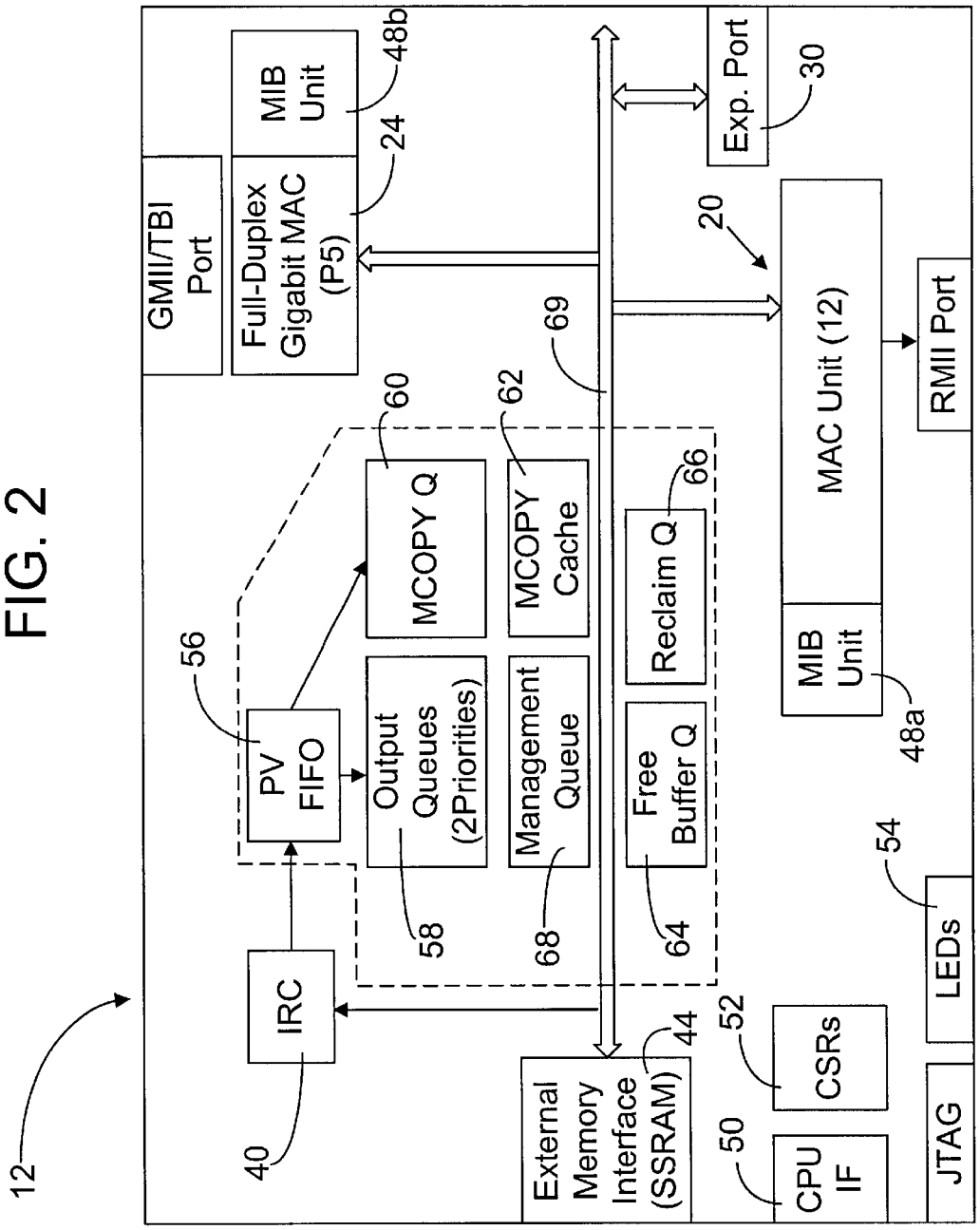
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data, memory structures, and MIB counter information. The external memory 36 is preferably either a Joint Electron Device Engineering Council (JEDEC) pipelined burst or Zero Bus Turnaround TM (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the 30 data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data flame, Rx port number, an untagged set field, VLAN information, opcode, and frame pointer. The format of the forwarding descriptor will discussed further with respect to FIG. 9. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers Mat can be reclaimed by the free buffer queue 64 as free pointers. After being returned to the free buffer queue 64, the frame pointer is available for reuse by the MAC unit 20 or the gigabit MAC unit 24.

Figure 3B:
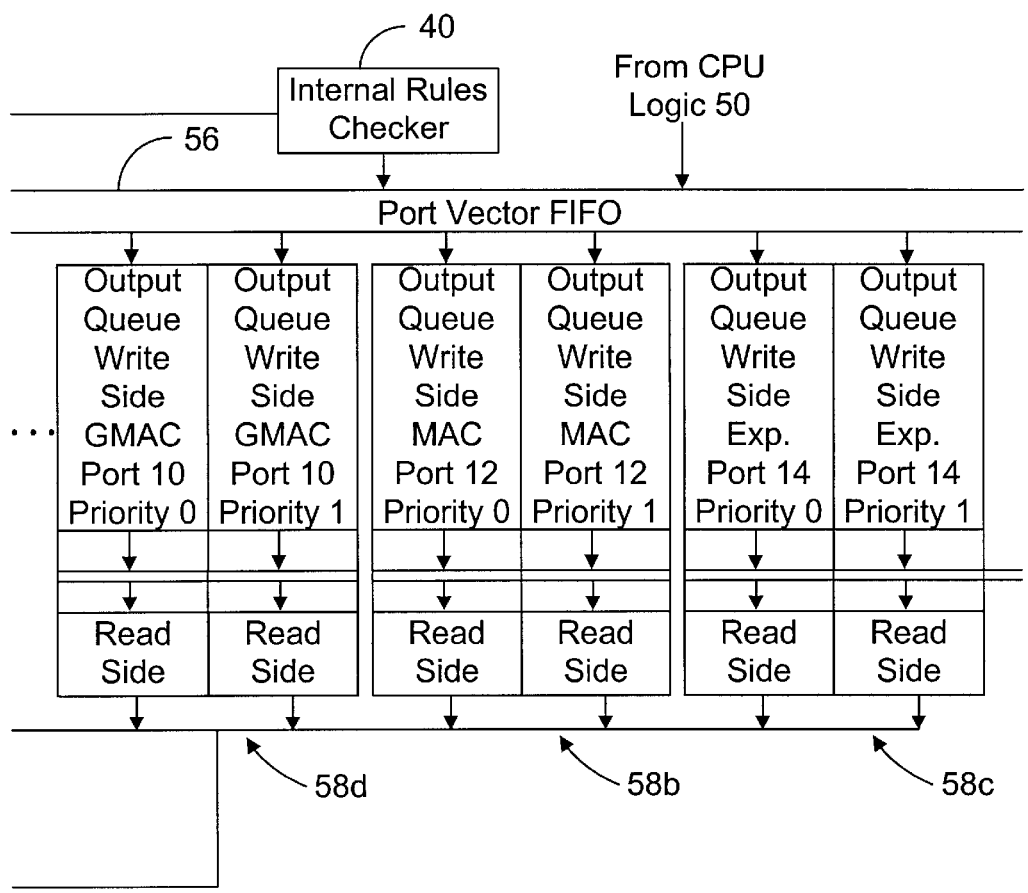
FIG. 3 is a detailed block diagram illustrating the switching subsystem of FIG. 2.
Figure 3C:
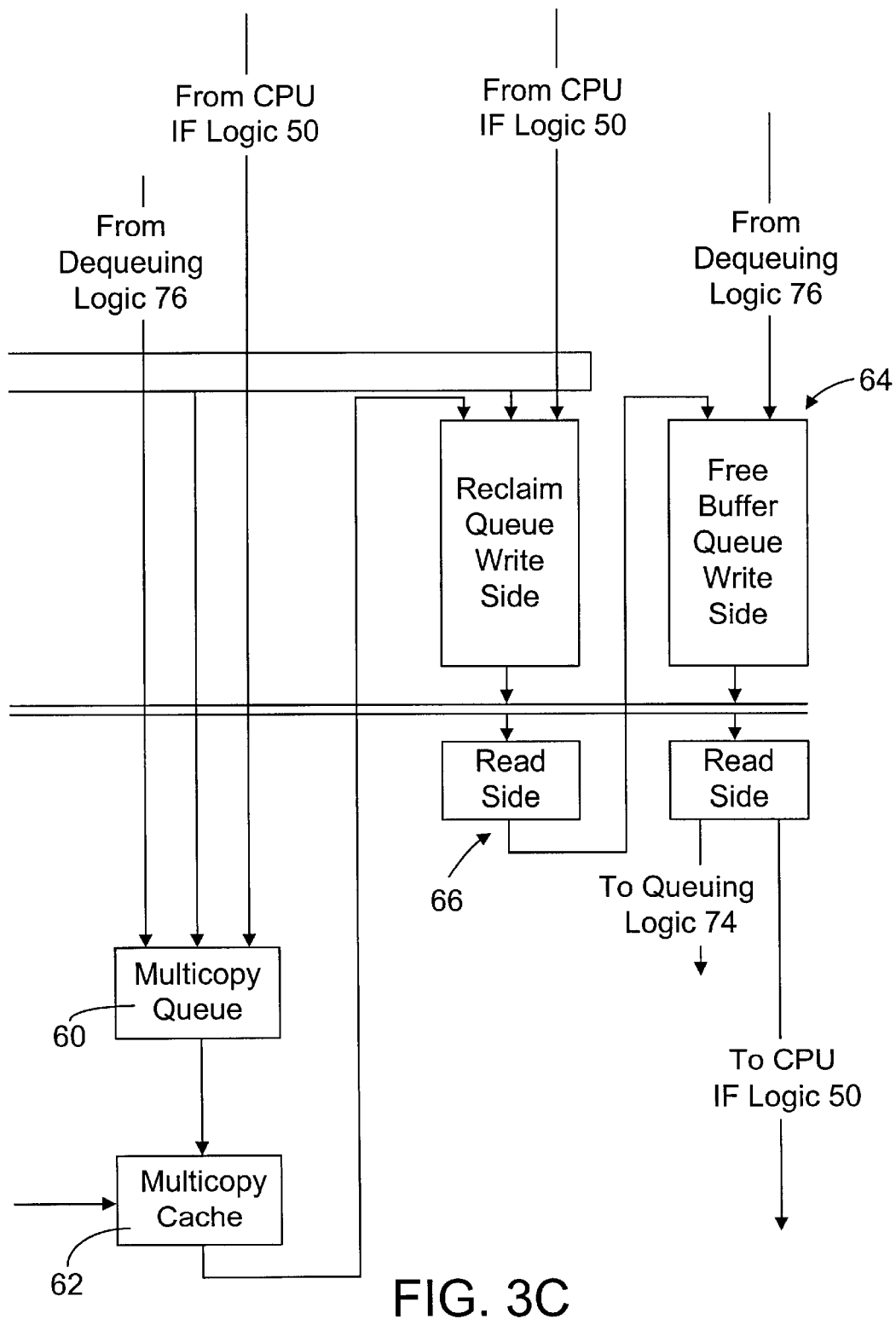

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a trait portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10,100, or 1000 Mb/s. Hence, the scheduler 80 controls the access by different ports to optimize usage of the bandwidth of 25 the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request 30 with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The sire bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frame pointers, and a low priority queue for low priority frame painters. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA traction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to I, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the multiport switch 12 will now be provided.

An internal rules checker 40 (IRC) is used to provide high data throughput. As described previously, the switch subsystem 42 provides the switching logic for receiving and forwarding frames to the appropriate output port(s). The forwarding decisions, however, are made by the IRC 40 located on the multiport switch 12.

Figure 4:
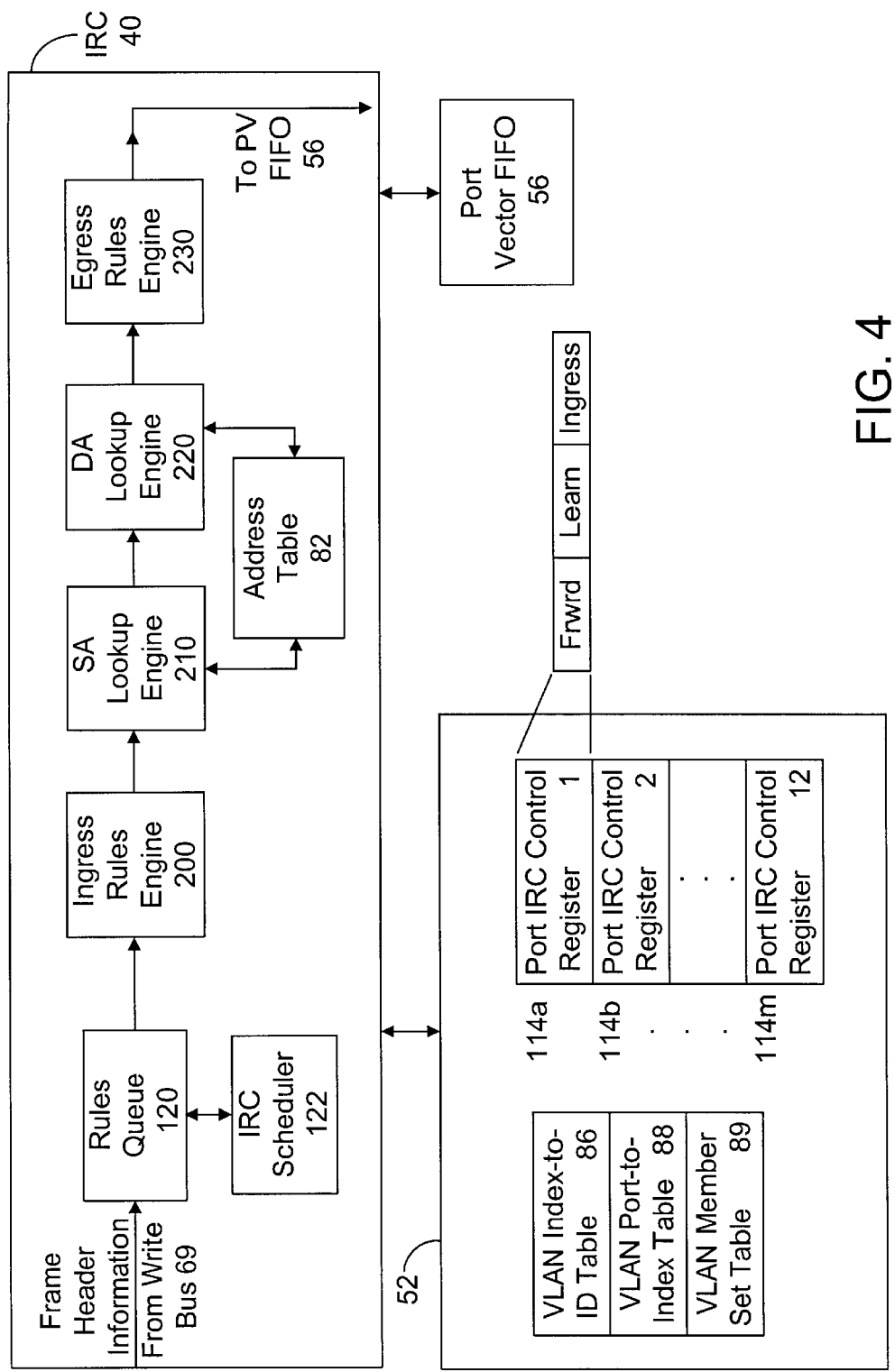
FIG. 4 is a block diagram of a system including the internal rules chapter of FIG. 2.

According to the exemplary embodiment illustrated in FIG. 4, the IRC 40 includes four functional logic blocks, an ingress rules engine 200, a source address (SA) lookup engine 210, a destination address (DA) lookup engine 220 and an egress rules engine 230. In the exemplary embodiment, the four engines 200, 210, 220 and 230 are employed as separate logic devices. In other words, each engine is designed in a modular fashion to receive input from other devices and to perform its particular functions without relying on processing logic from another logic engine. Advantageously, this modular architecture allows changes to be made to any of the particular logic engines without affecting other parts of the decision making process. However, in alternative configurations, the individual functions performed by each logic engine, discussed in detail below, as well as the particular number of logic engines may be modified, based on the particular network requirements. Additionally, in the exemplary embodiment, the entire IRC 40 is designed in a modular fashion, including a memory for storing frame headers and a scheduler for facilitating processing of the frame headers. Advantageously, storing the frame headers within the IRC 40 enables the IRC 40 to process the frames in an efficient manner without having to transmit handshaking signals to the respective MAC devices for forwarding the frame headers to the IRC 40.

The IRC 40 also includes address table 82. However, in alternative embodiments, the address table 82 may be located outside the IRC 40 within another part of the multiport switch 12 or even external to the multiport switch 12. According to the exemplary embodiment, the address table 82 supports 4096 user addresses and capabilities for 64 unique virtual local area networks (VLANs). However, the number of addresses and VLANs supported may be increased by expanding the table size. VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "subnetworks" within a larger network.

Figure 5:
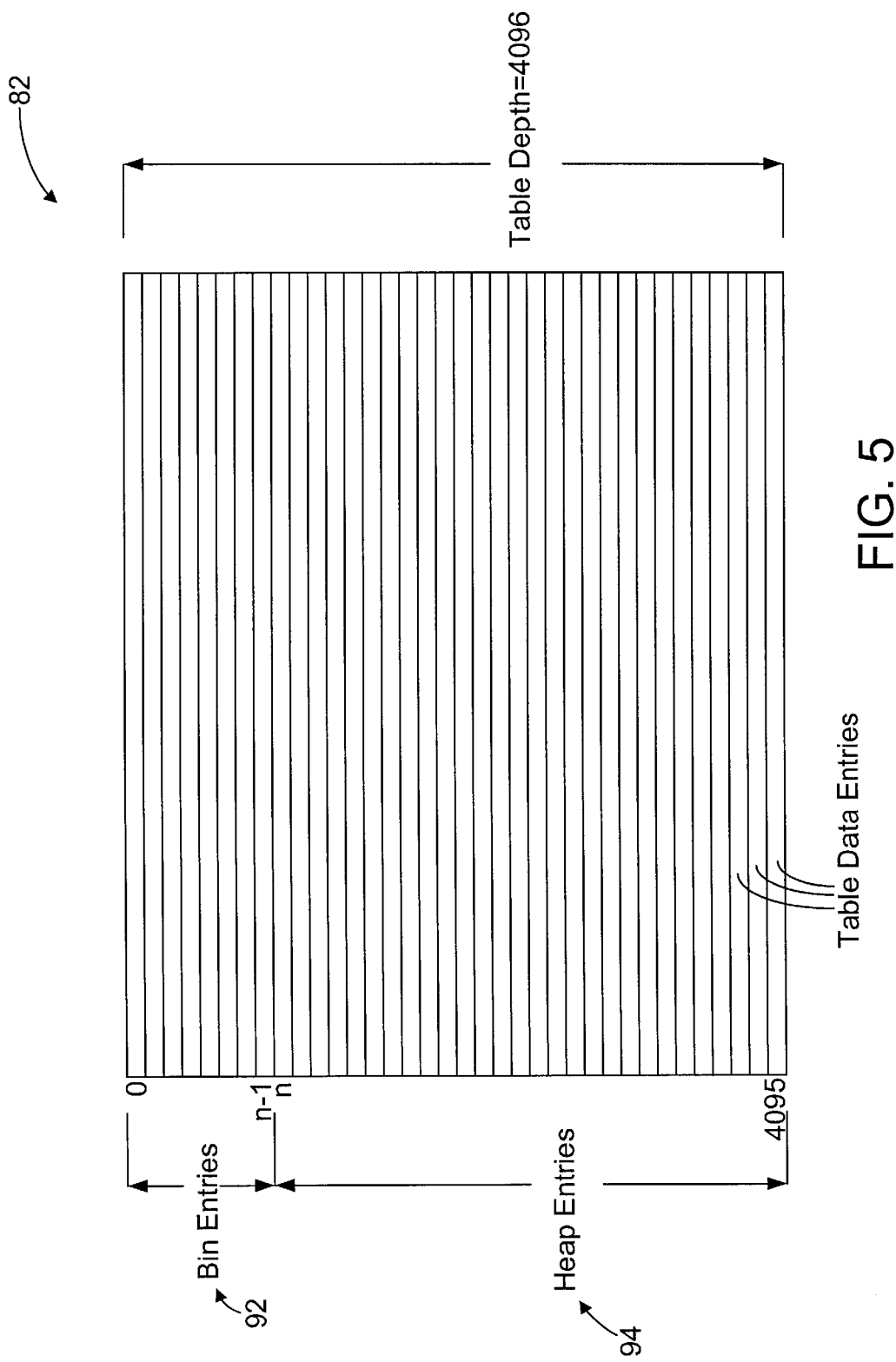
FIG. 5 illustrates the composition of the address table of FIG. 4.

FIG. 5 illustrates the organization of the IRC address table 82. The IRC address table 82 contains an array of 4096 entries. The first "n" entries 92 are referred to as "bin entries" and have addresses from "0" to "n−1". The remaining entries 94 are referred to as "heap entries" and have addresses from "n" to "4095".

FIG. 6 illustrates the composition of each table entry shown in FIG. 5. The hit bit (H) is used for address entry "aging" to delete entries from the address table that have not been used in a predetermined amount of time. The static bit (S) is used to prevent deletion of an address entry. The traffic capture bit (TC) identifies the traffic capture source and destination addresses for mirroring conversations to the management queue. The port vector (PV) is a field that provides a forwarding descriptor with a vector identifying the port(s) to which the frame should be forwarded. Each data entry includes a MAC address and an IP address, either of which can be used to access that data entry. Each data entry also includes a MAC NEXT POINTER to point to another data entry, and an IP NEXT POINTER to point to another data entry In the exemplary embodiment of the present invention, the host CPU 32 functions as the management entity and is connected to the IRC 40 via the CPU IF 50. Alternatively, a management MAC may be connected to the CPU IF 50 to function as the management entity. The IRC 40 uses the specific fields of the address table 82 to make frame forwarding decisions when frames are received in the switch 12. More specifically, the IRC 40 uses engines 200–230 to generate frame forwarding information and to create a forwarding descriptor for output to the port vector FIFO 56. As discussed previously, the multiport switch 12 stores incoming data frames in external memory 36. According to the exemplary embodiment illustrated in FIG. 4, the IRC 40 also includes a logically separate 4-deep rules queue 120 allocated for each receive port, i.e., the queue corresponding to each receive port holds four frame headers. However, in alternative configurations, the rules queue 120 may be configured to store other numbers of frame headers for each port, based on the particular network requirements.

The rules queue 120 "snoops" on the write bus 69 to external memory 36 to capture a predetermined portion of the data frames, including the destination and source addresses, transferred by queuing logic 74 to the buffers in external memory 36. For example, the rules queue 120 may store the first 40 bytes of the frame. When a frame has been completely transferred to external memory 36, the queuing logic 74 signals the end of the transfer and provides frame status information indicating whether the frame was received at the switch 12 without errors. The IRC 40 also includes IRC scheduler 122, illustrated in FIG. 4, which monitors the signaling from queuing logic 74 and stores the frame status information in the rules queue 120 along with the corresponding frame header.

The rules queue 120 monitors the number of entries present at each port. When a queue for a receive port has three entries, the IRC 40 signals flow-control/back-pressure logic associated with that receive port in order to regulate network activity, the details of which are not disclosed herein in order not to unduly obscure the thrust of the present invention.

When the end of frame (EOF) transfer has been signaled by the queuing logic 74, the IRC scheduler 122 enables the processing of the frame header through the ingress rules engine 200. Logic engines 200–230, as discussed previously, are separate logic devices and are able to process data frames in parallel, thereby increasing data throughput as compared to systems which employ a single decision making device. In other words, each logic engine is able to perform its respective processing on a different data frame simultaneously with the other respective logic engines. Advantageously, the data throughput of the multiport switch 12 including engines 200–230 may increase up to fourfold, as compared to a network switch that employs a single decision making device, since four data frames may be processed simultaneously. The operation of each logic engine, according to the exemplary embodiment, will be described below.

The ingress rules engine 200 performs a variety of preprocessing functions for each frame header. For example, ingress rules engine 200 checks to see if a data frame was received with errors by reading the frame status information stored with the respective frame headers in rules queue 120. When the ingress rules engine 200 determines that a receive error has occurred, the ingress rules engine 200 constructs a forwarding descriptor with a null port vector, e.g., a port vector with all zeros or some other predetermined value, that will cause the frame to be discarded. Optionally, frames with errors may be forwarded to the host CPU 32 for diagnostic purposes.

The ingress rules engine 200 also checks the source address of the received frame to determine whether the Individual/Group (I/G) bit is set. If the I/G bit is set, indicating a multicast source address, the ingress rules engine 200 handles the frame as if the frame was received with errors. That is, the ingress rules engine 200 creates a forwarding descriptor with a null port vector.

The ingress rules engine 200 also checks the destination address (DA) of the frame to determine if the frame should be sent to the management entity, e.g., host CPU 32. Specifically, the ingress rules engine 200 looks for Bridge Protocol Data Units (BPDUs), Generic Attribute Registrations Protocol (GARP) frames, MAC Control Frames and frames with certain Physical MAC addresses. The ingress rules engine 200 identifies these types of frames based on their specific destination address information. When the ingress rules engine 200 detects a match with one of the above DAs, the ingress rules engine 200 conducts a forwarding descriptor identifying the management port as the forwarding port.

The ingress rules engine 200 also determines whether SA and DA lookups will be performed by engines 210 and 220, respectively, based on whether learning and forwarding are set in the respective port IRC control registers 114a–m, illustrated in FIG. 4, in addition to whether the data frame was received with errors or is one of the specific types of frames to be transmitted to the management port, discussed above. According to the exemplary embodiment of the invention, the multiport switch 12 includes one port IRC control register 114 for each of the twelve 10/100 Mb/s ports and for the 1 Gb/s port. In alternative configurations, a single register could be used to store the appropriate control information for the respective ports.

Referring to FIG. 4, each port IRC control register 114 includes a learn bit and a forward (frwrd) bit. A set learn bit allows the IRC to "learn" unknown MAC and IP source addresses received by the corresponding port, i.e., add new entries not stored in address table 82. A set frwrd bit allows frames received by the corresponding port to be forwarded to other ports and allows frames received by other ports to be transmitted from this port. When learning is set and forwarding is not set in the port IRC control register 114 corresponding to the port on which the frame was received, only the SA lookup is performed. That is, the SA lookup is performed so that a new entry may be added to the address table 82 and the SA lookup engine 210 generates a forwarding descriptor with a null port vector. When learning and forwarding are both set in the port IRC control register 114 corresponding to the receive port, both SA and DA lookups are performed, as discussed in more detail below. When learning and forwarding are both clear in the port IRC control register 114 corresponding to the receive port, neither the SA nor DA lookups is performed. In this case, the ingress rules engine 200 generates a forwarding descriptor with a null port vector.

Optionally, the ingress rules engine 200 performs VLAN ingress filtering to prevent the multiport switch 12 from forwarding a frame that does not belong to a VLAN associated with the receiving port. The port IRC control registers 114 each include an ingress bit which, when set, indicates that ingress filtering is enabled Ingress filtering according to the exemplary embodiment of the present invention proceeds as follows.

Initially, the ingress rules engine 200 determines whether a received frame has no VLAN tag header or if the VLAN tag header has a VLAN ID equal to "0". When the frame has no VLAN tag header or the VLAN ID is "0", the ingress rules engine 200 does not perform ingress filtering regardless of the state of the ingress bit. Otherwise, the ingress rules engine 200 retrieves the VLAN index corresponding to the frame's VLAN ID from the VLAN index-to-ID table 86. If the frame's VLAN I) is not found in this table, the ingress rules engine 200 forwards the frame to the management port only.

After processing by ingress rules engine 200, the IRC 40 performs SA and DA searches of address table 82, based on whether learning and forwarding are enabled as discussed above. The multiport switch 12 needs to make frame forwarding decisions relatively quickly, since multiple data frames may be received by the multiport switch 12 simultaneously. Hence, in the exemplary embodiment of the present invention, a hashing scheme is used to search only a subset of the address entries, as described below. The memory structure of FIG. 5 provides an indexed arrangement, where a given network address will be assigned to a corresponding bin. In other words, each bin entry 96 is configured to reference a plurality of table entries (i.e., heap entries) 98. Hence, the SA lookup engine 210 performs a search of the address table 82 by first accessing a specific bin 96 pointed to by a hash key, and then searching the entries within (i.e., referenced by) the corresponding bin to locate the appropriate match.

Figure 7:
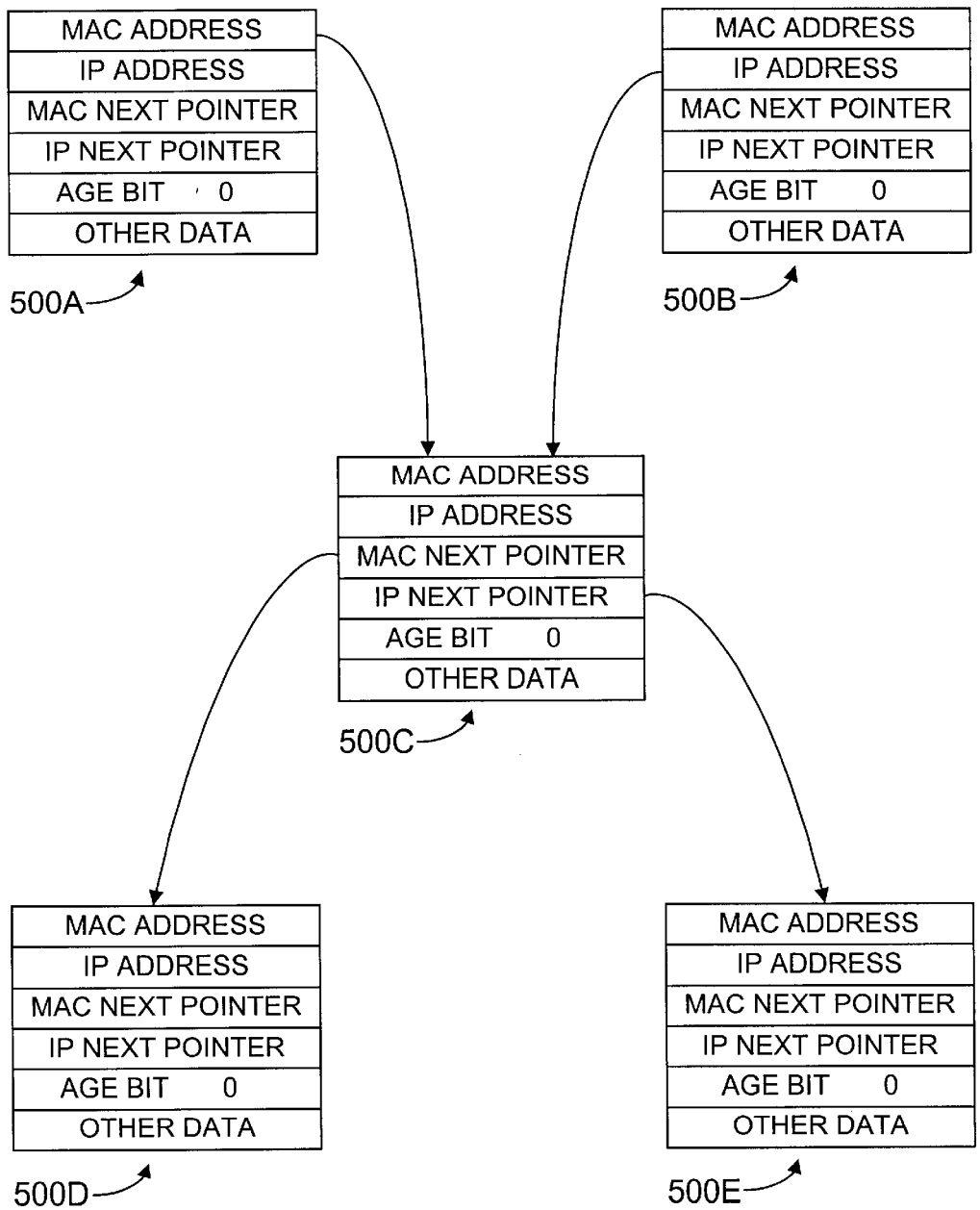
FIGS. 7–11 are a series of similar illustrations, each showing a number of data entries and their interrelationship at the invention is described.

FIG. 7 shows a plurality of data entries 500A, 500B, 500C, 500D, 500E of the table 82, each of which is a string of data taking the form shown in FIG. 6. As such, each data entry includes a MAC ADDRESS, an IP ADDRESS, a MAC NEXT POINTER, an IP NEXT POINTER, and an AGE BIT, the remaining data of the data entry being referred to as OTHER DATA. Each data entry is addressable by either its MAC ADDRESS or its IP ADDRESS. The MAC NEXT POINTER and IP NEXT POINTER of each data entry point to other data entries. In the state shown in FIG. 7, each of the AGE BITS is in its first, 0 state, indicating that each data entry has been addressed by means of either its MAC ADDRESS or its IP ADDRESS within a set amount of time, so that none of the data entries shown in FIG. 7 is marked for "aging". In this state, the pointer from the MAC ADDRESS of the data entry 500A, upstream of the data entry 500C, points to the data entry 500C, and the pointer from the IP ADDRESS of the data entry 500B, also upstream of the data entry 500C, also points to the data entry 500C. The MAC NEXT POINTER of the data entry 500C points to the data entry 500D downstream of the data entry 500C, while the IP NEXT POINTER of the data entry 500C points to the data entry 500E, also downstream of the data entry 500C.

Figure 8:
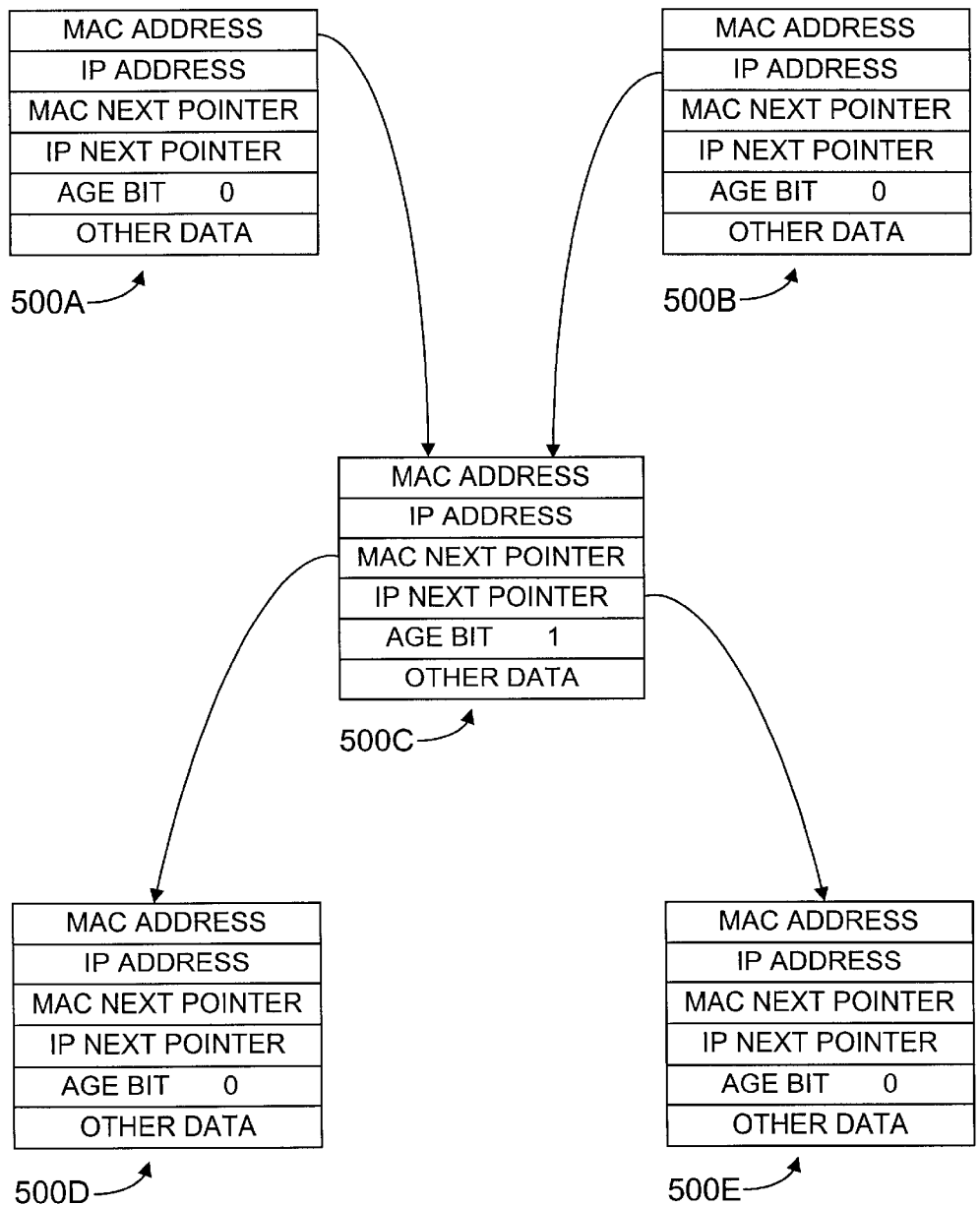
Figure 9:
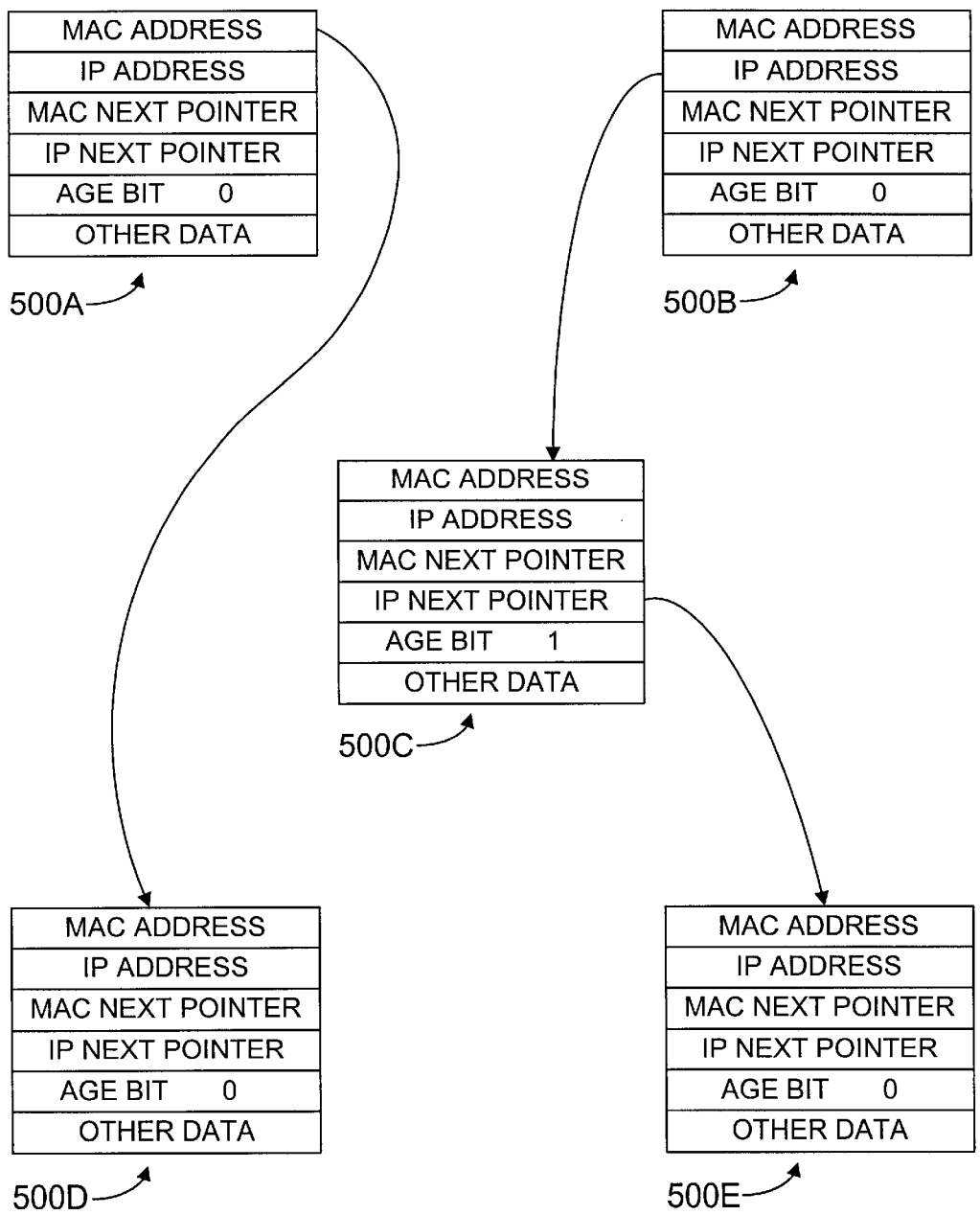
Figure 10:
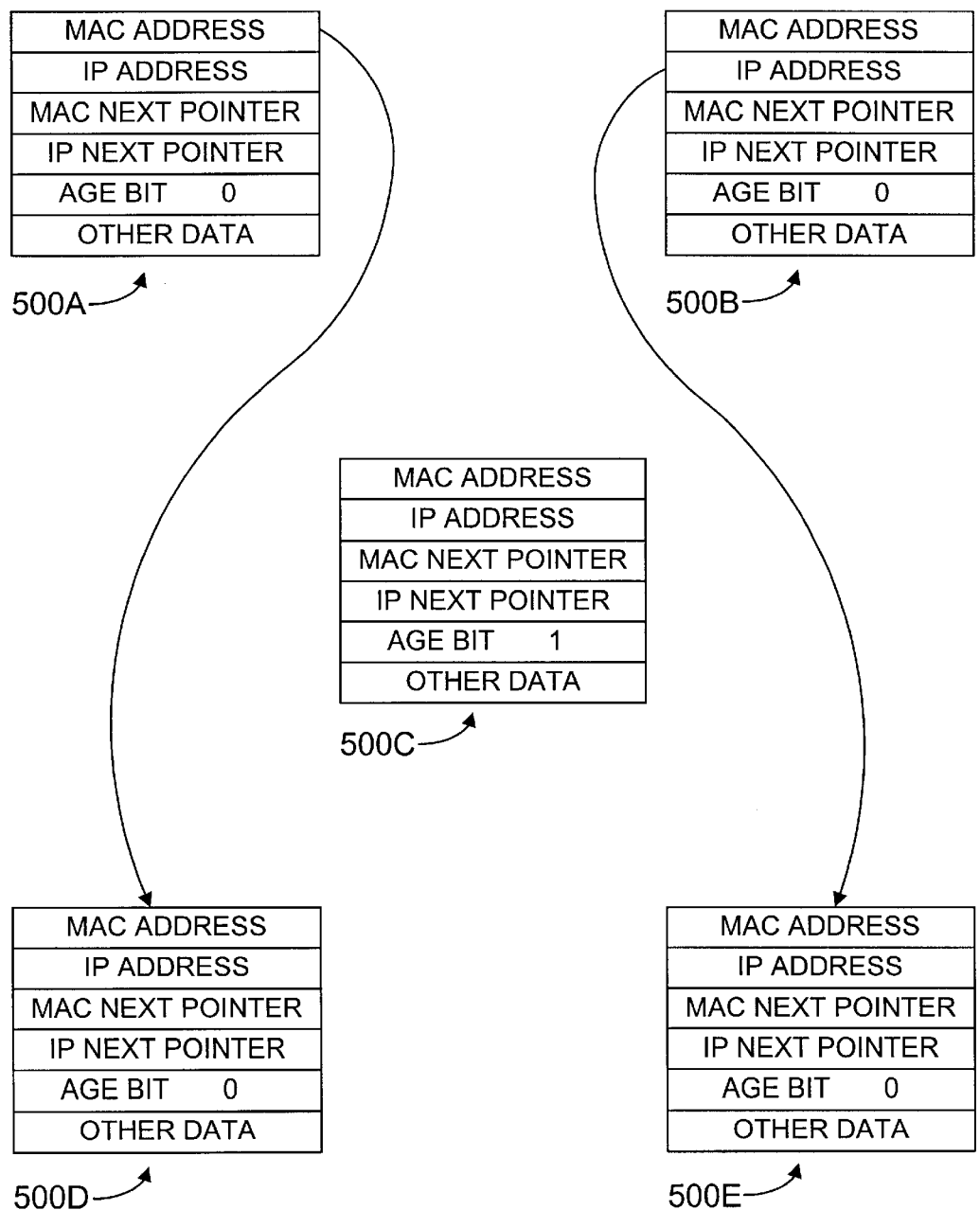

After a chosen interval of time, if, for example, the specified data entry 500C has not been addressed by means of either its MAC ADDRESS or IP ADDRESS, that data entry 500C is marked for "aging" wherein the AGE BIT changes from 0 to 1 (FIG. 8). This indicates that the data entry 500C is in a relatively inactive state and can be deleted and replaced by another data entry for increased overall operating efficiency. (If, during the chosen interval of time, the data entry 500C had been addressed by means of either its MAC ADDRESS or IP ADDRESS, the aging time interval would be reset). However, prior to such deletion of the entry, the pointers must be accounted for so that the table 82 does not have broken, illegal or incorrect links between data entries which would compromise its function. In furtherance thereof, at this point, the pointer from the MAC ADDRESS of the upstream data entry 500A to the data entry 500C is redirected to the downstream data entry 500D, i.e., is redirected to the original destination of the MAC NEXT POINTER of the data entry 500C (FIG. 9). Also, the pointer from the IP ADDRESS of the upstream data entry 500B to the data entry 500C is redirected to the downstream data entry 500E, i.e., is redirected to the original destination of the IP NEXT POINTER of the data entry 500C (FIG. 10).

Figure 11:
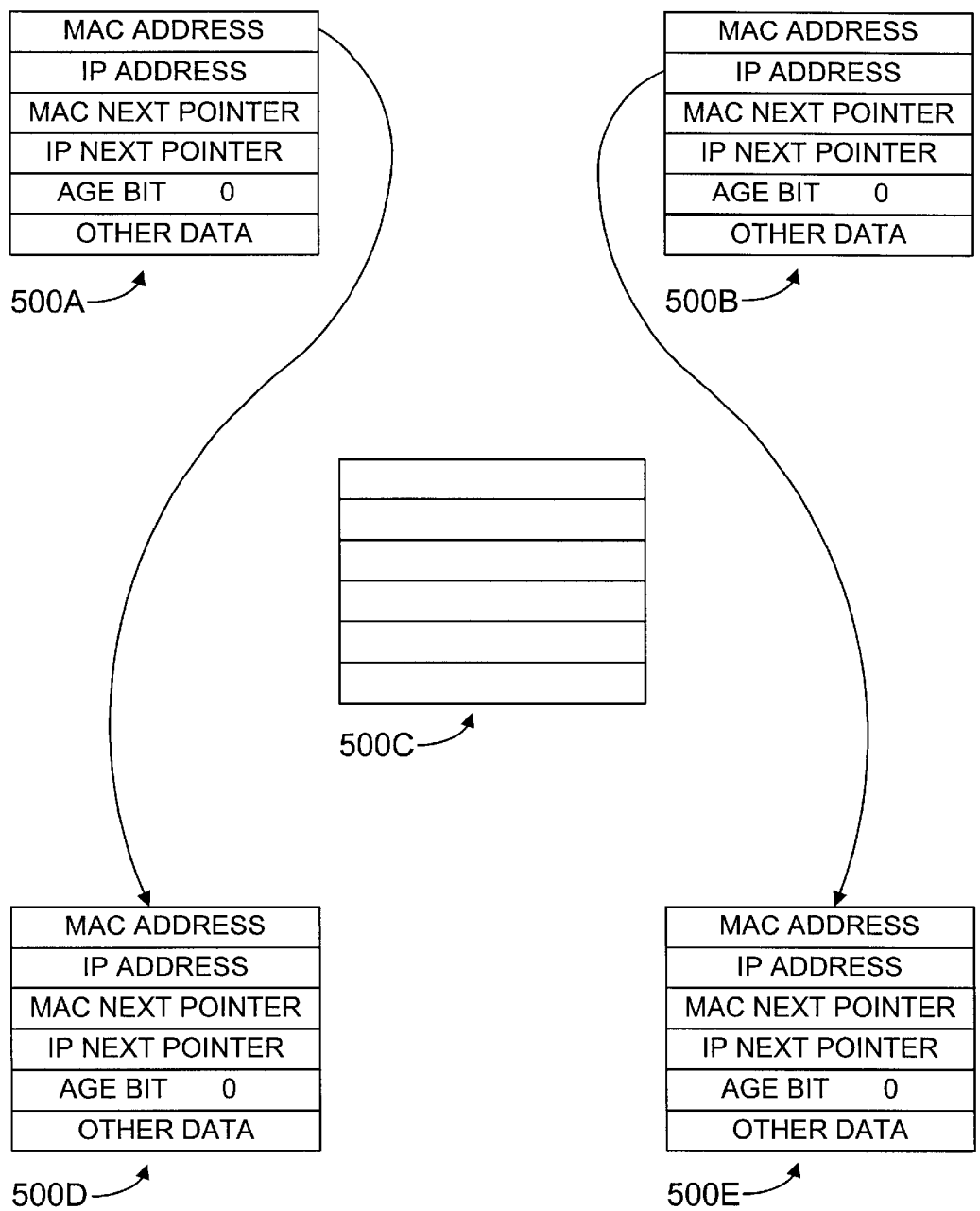

As will now be seen, the pointers originally directed to the data entry 500C have been redirected from the upstream data entries 500A, 500B to the downstream data entries 500D, 500E respectively, and the data entry 500C now has no pointers directed thereto. The data entry 500C (including the portions of the data entry relating to MAC NEXT POINTER and IP NEXT POINTER) is now ready for deletion (FIG. 11), and it is now insured that incorrect links of data within the table 82 are avoided.

It is important to note that prior to the deletion of a data entry due to aging thereof, both the MAC chain of pointers and the IP chain of pointers must be updated in accordance with the above description. If this is not done, broken, illegal or incorrect links between data entries in the table can occur. Running both the IP and MAC chains of pointers prior to deletion of the data entry ensures continued proper functioning of the table through avoidance of incorrect links of data.

The foregoing description of the embodiment of the invention has been presented for purposes of illustration and description. It is not intended to be exhaustive or to limit the invention to the precise form disclosed. Other modifications or variations are possible in light of the above teachings.

The embodiment was chosen and described to provide the best illustration of the principles of the invention and its practical application to thereby enable one of ordinary skill of the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. For use with a table containing a plurality of data entries, each data entry comprising a string of data that contains a first address addressable by a first pointer from an upstream data entry and a second address addressable by a second pointer from an upstream data entry, and which string of data further contains a third pointer for addressing the address of a downstream data entry and a fourth pointer for addressing the address of a downstream data entry, a method of aging a specified data entry comprising:

> detecting, after a chosen interval of time, if the specified data entry has been addressed by means of its first address or its second address, and if the specified data entry has not been so addressed, redirecting the first and second pointers to the destinations of the third and fourth pointers respectively.

2. The method of claim 1 and further comprising the step of deleting the specified data entry from the table after redirecting the first and second pointers to the destinations of the third and fourth pointers respectively.

3. The method of claim 2 and further comprising the step of changing an aging bit in the specified data entry from a first value to a second value after a set length of time has passed during which the specified data entry has not been addressed by means of either its first address or its second address.

4. The method of claim 3 wherein the step of redirecting the first pointer to the destination of the third pointer comprises directing the first pointer to the first address of the specified data entry, detecting whether the aging bit of that specified data entry is in its second state, and if the aging bit is in its second state, redirecting the first pointer to the destination of the third pointer, and wherein the step of redirecting the second pointer to the destination of the fourth pointer comprises directing the second pointer to the second address of the specified data entry, detecting whether the aging bit of that specified data entry is in its second state, and if the aging bit is in its second state, redirecting the second pointer to the destination of the fourth pointer.

5. For use with a table containing a plurality of data entries, each data entry comprising a string of data that contains a first address addressable by a first pointer from a first upstream data entry and a second address addressable by a second pointer from a second upstream data entry, and which string of data further contains a third pointer for addressing the address of a first downstream data entry and a fourth pointer for addressing the address of a second downstream data entry, a method of aging a specified data entry comprising:

> detecting, after a chosen interval of time, if the specified data entry has been addressed by either the first pointer from the first upstream data entry or the second pointer from the second upstream data entry, and if the specified data entry has not been so addressed, redirecting the first and second pointers to the first and second downstream data entries respectively.

6. The method of claim 5 and further comprising the step of deleting the specified data entry after redirecting the first and second pointers to the first and second downstream data entries respectively.

7. The method of claim 5 and further comprising the step of changing an aging bit in the specified data entry from a first value to a second value after a set length of time has passed during which the specified data entry has not been addressed by either the first pointer or the second pointer.

8. The method of claim 7 wherein the step of redirecting the first pointer to the first downstream data entry comprises directing the first pointer to the first address of the specified data entry, detecting whether the aging bit of that data entry is in its second state, and if the aging bit is in its second state, redirecting the first pointer to the first downstream data entry, and wherein the step of redirecting the second pointer to the second downstream data entry comprises directing the second pointer to the second address of the specified data entry, detecting whether the aging bit of that specified data entry is in its second state, and if the aging bit is in its second state, redirecting the second pointer to the second downstream data entry.

9. The method of claim 8 and further comprising the step of deleting the specified data entry after redirecting the first and second pointers to the first and second downstream data entries respectively.

10. The method of claim 9 wherein the first address of the specified data entry is a media access control (MAC) address, and the second address of the specified data entry is an Internet Protocol (IP) address.

* * * * *